US010120341B2

(12) United States Patent
Bossart et al.

(10) Patent No.: US 10,120,341 B2
(45) Date of Patent: Nov. 6, 2018

(54) METHOD FOR DETERMINING AN IMBALANCE CHARACTERISTIC OF AN OSCILLATOR

(71) Applicant: ROLEX SA, Geneva (CH)

(72) Inventors: Richard Bossart, Lausanne (CH); Marc Cerutti, Saint-Julien-en-Genevois (FR); Frédéric Burger, Petit-Lancy (CH); Olivier Hunziker, Vevey (CH); Denis Favez, Le Grand-Saconnex (CH)

(73) Assignee: ROLEX SA, Geneva (CH)

( * ) Notice: Subject to any disclaimer, the term of this patent is extended or adjusted under 35 U.S.C. 154(b) by 787 days.

(21) Appl. No.: 14/411,235

(22) PCT Filed: Jun. 25, 2013

(86) PCT No.: PCT/EP2013/063292
§ 371 (c)(1),
(2) Date: Jan. 27, 2015

(87) PCT Pub. No.: WO2014/001341
PCT Pub. Date: Jan. 3, 2014

(65) Prior Publication Data

US 2015/0338829 A1 Nov. 26, 2015

(30) Foreign Application Priority Data

Jun. 26, 2012 (EP) .................................... 12173570

(51) Int. Cl.
*G01D 7/08* (2006.01)
*G04D 7/10* (2006.01)
(Continued)

(52) U.S. Cl.
CPC ............... *G04D 7/10* (2013.01); *G04B 17/20* (2013.01); *G04D 7/082* (2013.01); *G04D 7/085* (2013.01);
(Continued)

(58) Field of Classification Search
CPC ........ G04D 7/088; G04D 7/004; G04D 7/087; G04D 7/082; G04D 7/10; G04D 7/08;
(Continued)

(56) References Cited

U.S. PATENT DOCUMENTS

| | | | |
|---|---|---|---|
| 2,113,825 | A | 4/1938 | Caldwell et al. |
| 2,479,875 | A | 8/1949 | Meredith |

(Continued)

FOREIGN PATENT DOCUMENTS

| | | | |
|---|---|---|---|
| CH | 532 284 | A | 1/1967 |
| CH | 577 212 | B5 | 6/1976 |

(Continued)

OTHER PUBLICATIONS

Translatiion of FR 1285877 reference.*

(Continued)

*Primary Examiner* — Helen Kwok
(74) *Attorney, Agent, or Firm* — Westerman, Hattori, Daniels & Adrian, LLP

(57) ABSTRACT

A method for determining an imbalance characteristic of a hairspring (5) balance (4) oscillator (3) of a timepiece movement (2), the method comprising at least the following steps: —Setting the hairspring balance oscillator in an oscillating motion at at least two amplitudes, —Determining, for each amplitude and for at least two positions of the oscillator, a piece of data representative of the oscillation period of the oscillator, —Using the data from the previous step to calculate the imbalance characteristic of the hairspring balance oscillator.

20 Claims, 6 Drawing Sheets

(51) Int. Cl.

| | |
|---|---|
| ***G04B 17/20*** | (2006.01) |
| ***G04D 7/08*** | (2006.01) |
| ***G04D 7/12*** | (2006.01) |

(52) U.S. Cl.
CPC ......... *G04D 7/1214* (2013.01); *G04D 7/1242* (2013.01)

(58) Field of Classification Search
CPC ...... G04D 7/085; G04B 17/20; G04B 17/063; G04B 17/066; G04B 17/00; G04B 18/006
See application file for complete search history.

(56) References Cited

U.S. PATENT DOCUMENTS

| | | | | |
|---|---|---|---|---|
| 2,554,033 | A | 5/1951 | Kohlhagen | |
| 2,745,287 | A | 5/1956 | Kohlhagen | |
| 3,225,586 | A | 12/1965 | Reber, Jr. | |
| 3,695,032 | A * | 10/1972 | Lawson | G04D 7/1292 368/170 |
| 6,534,742 | B2 | 3/2003 | Serex | |
| 6,609,822 | B1 | 8/2003 | Tokoro et al. | |
| 6,666,575 | B2 * | 12/2003 | Scheufele | G04B 18/006 368/127 |
| 7,344,302 | B2 * | 3/2008 | Musy | F16F 1/10 368/175 |
| 8,528,421 | B2 * | 9/2013 | Cerutti | G04D 7/08 73/862.08 |
| 8,672,536 | B2 * | 3/2014 | Henein | G04B 17/00 368/128 |
| 9,235,192 | B2 * | 1/2016 | Verardo | G04D 7/085 |
| 9,436,162 | B2 * | 9/2016 | Klinger | G04D 7/004 |
| 9,690,260 | B2 * | 6/2017 | Verardo | G04D 7/085 |
| 2002/0070203 | A1 | 6/2002 | Serex | |
| 2007/0222276 | A1 * | 9/2007 | Verardo | G04B 18/006 301/12.1 |
| 2012/0014229 | A1 * | 1/2012 | Mallet | G04B 18/006 368/175 |
| 2013/0148479 | A1 * | 6/2013 | Peters | G04B 13/00 368/127 |
| 2013/0272100 | A1 | 10/2013 | Klinger et al. | |

FOREIGN PATENT DOCUMENTS

| | | | |
|---|---|---|---|
| CH | 690 874 | A5 | 2/2001 |
| CH | 691 992 | A5 | 12/2001 |
| CN | 1348554 | A | 5/2002 |
| CN | 1357803 | A | 7/2002 |
| DE | 1 648 543 | A1 | 4/1971 |
| FR | 1210892 | A | 3/1960 |
| FR | 1285877 | A | 2/1962 |
| FR | 2159367 | A1 | 6/1973 |
| JP | S49/10069 | B1 | 3/1974 |
| WO | 01/48564 | A1 | 7/2001 |
| WO | 2012/007460 | A1 | 1/2012 |

OTHER PUBLICATIONS

Chinese Office Action dated Aug. 3, 2016 issued in corresponding Chinese application No. 201380034527X; with English translation (26 pages) (FR1285877A, CH690874A, US2479875A, CH577212 cited in the Chinese Office Action are not listed in this IDS since they were listed in a previous IDS filed Dec. 14, 2014).

Chinese Office Action dated Aug. 3, 2016 issued in corresponding Chinese application No. 201380034527X; re-submitted with English alternate (non-machine) translation (24 pages) (previously submitted with machine translation in the IDS of Aug. 19, 2016).

Japanese Office Action dated Mar. 14, 2017 issued in corresponding Japanese application No. 2015-519060; with English translation (6 pages) (FR1285877A cited in the Japanese Office Action is not listed in this IDS since it was listed in the IDS filed Dec. 24, 2014).

Matthew Clark, "Poising Error and Balance Wheel Amplitude", Horological Times, Jul. 2000, pp. 18-21.

International Search Report dated Oct. 15, 2013 issued in corresponding application No. PCT/EP2013/063292, and written opinion; with English partial translation and partial machine-translation.

* cited by examiner

METHOD FOR DETERMINING AN IMBALANCE CHARACTERISTIC OF AN OSCILLATOR

BACKGROUND ART

The invention relates to a method for determining an imbalance characteristic of a hairspring-balance oscillator of a horology movement. It also relates to a method for regulation of a hairspring-balance oscillator, comprising implementation of a method for determination of this type. It also relates to a balance or a hairspring-balance oscillator obtained by means of implementation of a method for regulation of this type, and a movement or a horology piece comprising a balance or a hairspring-balance oscillator of this type.

Balancing of the balance is one of the most important steps of production of a hairspring-balance oscillator which is designed to equip a horology movement. In fact, in an ideal situation, the center of gravity of the balance must be on its axis of rotation, under penalty of inducing defects which quickly become detrimental for the chronometry of the movement. The conventional machining techniques are in general not accurate enough to guarantee good balance of the balance, and this balance is further modified by rendering the balance integral with the other components which form the hairspring-balance (driving of the staff, plate, collet, hairspring). An imbalance measurement and subsequent correction are in general undertaken on the balance provided only with its staff and the plate, before pairing with the hairspring and assembly in movement.

This balancing of the balance alone makes it possible to obtain good chronometric performance, but scope for improvement remains in view of the residual imbalance which persists and/or is generated by the driving in of the hairspring. Solutions for balancing of the assembled hairspring-balance oscillator in motion exist ("dynamic balancing"), but these are unsatisfactory, since they can give rise to deterioration of the chronometry instead of resulting in the improvement required.

The static imbalance of the balance characterizes the off-centering of the center of gravity of the balance relative to the axis of rotation. This imbalance is the product of the mass of the balance times the distance between its center of gravity and the axis of rotation. In the case of horology balances, the imbalance is typically measured in μg·cm or nN·m. With terrestrial gravity, 1 μg·cm corresponds to approximately 0.1 nN·m.

It is found that:

- The effect of the imbalance on the rate is proportional to the imbalance itself.
- The effect of the imbalance is inversely proportional to the inertia of the balance. It will therefore be all the greater, the lower the level of inertia.
- The effect of the imbalance is highly dependent on the amplitude of oscillation of the balance. It is even cancelled out completely for an amplitude close to 220°.
- The effect of the imbalance varies as the sine of the azimuth angle between the axis of the balance (in general the direction at right-angles to the plane of the movement) and the vertical.
- The effect of the imbalance varies with the angle between the direction of the imbalance and the vertical. For example, when the axis of the balance is horizontal, there are two opposite positions where the imbalance is cancelled out, and two positions perpendicular to these two first positions where it is maximum, but these positions are not generally the four normalized vertical positions of the watch.

Usually, the imbalance of the balance is measured and adjusted before assembly with the hairspring. The measurement can be performed by rotating the balance around its staff placed horizontally between two bearings, and by measuring the oscillation and/or the reaction forces of the support by means of piezoelectric sensors. The imbalance value is obtained by calibration of the signal. A balancing operation is then carried out which consists of removing material from the felloe of the balance in a targeted manner.

Another possibility consists of carrying out "dynamic balancing" which consists of minimizing the rate differences between positions by modifying the balancing of the balance on the basis of measurement in motion at a given amplitude. This method is unreliable: the effect of the imbalance is not necessarily preponderant in comparison with other sources of amplitude differences for which the measurement is performed. By using the balancing to correct the sum of these effects, it is perfectly possible to worsen considerably the imbalance of the balance, which will disrupt the chronometric performance, in particular at low amplitudes. An approach of this type should therefore be avoided, and is strongly advised against in the literature.

In the article "La mise d'équilibre des balanciers" ("Balancing of the balances"), Proceedings of the Swiss Chronometry Congress 1966, p. 324, J.-J. Augsburger defines balancing defects, their effects on the rate of the movement, and the means for measuring them, as well as the balancing means available at the time. Theoretical development indicates that the effect of the imbalance is cancelled out at an amplitude of 220°, and that the effect on the rate is directly proportional to the imbalance, and is all the more noticeable, the lower the level of inertia of the balance. Careful balancing by means of milling makes it possible to bring the imbalance of a balance alone down to a mean value of 1.5 μg·cm.

In the article "L'équipement pour l'équilibrage dynamique du système oscillant balancier-spiral REGLOWITCH-M" ("The M. REGLOWITCH equipment for dynamic balancing of the hairspring-balance oscillator system"), Proceedings of the $6^{th}$ European Chronometry Congress 1996, p. 153, Furer et al. describe a dynamic balancing apparatus: the rate and the amplitude of a movement are measured in the different horological positions, for a single state of winding of the barrel, and therefore at a single amplitude value situated either between 150° and 180°, or above 260°. This therefore involves conventional dynamic balancing with a measurement carried out at a single amplitude, meaning that the effect measured can very well be derived from a source other than the imbalance, and that the correction carried out on this basis has as much chance of worsening the imbalance as it does of improving it. Furthermore, the term "dynamic balancing" seems to be inappropriate, since the method described aims to adjust the difference between positions at a given amplitude, and not to balance the hairspring-balance.

The document "Traité de construction horlogère" ("Horology Construction Treatise"), Presses Polytechniques et Universitaires Romandes, Lausanne 2011, pp. 190-200, by M. Vermot et al., devotes a chapter to the balance defect of the balance alone and its consequences. The different measurement methods are reviewed. The method of "rate to positions", which corresponds to the dynamic balancing referred to in the article "L'équipement pour l'équilibrage dynamique du système oscillant balancier-spiral REGLOW- ITCH-M" is mentioned: a low amplitude is recommended for the measurement in order to maximise the effects. However, it is clearly stated that this method "lacks precision because of all the hypotheses formulated for its application", and that "in practice, it is not possible to detect imbalances which are sufficiently great in order for the effects on the rate not to be concealed in other rate variations [ . . . ]".

U.S. Pat. No. 3,225,586 proposes a method for simultaneous regulation of the rate and "dynamic balancing" by means of four screws placed on the felloe of the balance, based on a measurement of the rate in four vertical positions. It is noted that a tool of the slide rule type makes it possible to convert the result of the measurement directly into the number of turns to be applied to each screw. The correction procedure is very specific to the measurement apparatus used ("Watchmaster", U.S. Pat. No. 2,113,825) and cannot be adapted to more recent measurement means.

Patent application WO2012007460 is a recent example of a device for measurement and correction of the balance defect of a balance. This application describes a method for balancing the hairspring-balance assembly, in particular when the balance is fitted in a watch movement. The balancing is carried out by addition and/or removal and/or displacement of material, in particular by means of the laser machining type. Advantageously, it is recommended to carry out the measurement and/or correction of the balance at a fixed amplitude with a value of 137° or 316.5°: according to the inventors, these two amplitude values make it possible to avoid imbalance caused by the material added or removed, i.e. the centre of the mass of the material removed or added is situated at the centre of the hairspring-balance assembly. However, no details are given concerning the manner of measuring the balance defect of the hairspring-balance.

SUMMARY OF THE INVENTION

The object of the invention is to provide a method for determining an imbalance characteristic which makes it possible to eliminate the aforementioned disadvantages, and to improve the methods known in the prior art. In particular, the invention proposes a method for determining an imbalance characteristic which is accurate and reliable.

A method for determination according to the invention is defined by point 1 below.

1. A method for determining, in particular for calculating, an imbalance characteristic of a hairspring (5)-balance (4) oscillator (3), in particular a hairspring-balance (4) oscillator (3) which is designed to be fitted in a horology movement (2), the method comprising at least the following steps:

putting the hairspring-balance oscillator into oscillating motion at two amplitudes at least;

determining for each amplitude and for at least two positions of the oscillator, data which is representative of the period of oscillation of the oscillator;

using the data from the preceding step in order to calculate the imbalance characteristic of the hairspring-balance oscillator.

Different embodiments of the method for determination are defined by points 2 to 12 below.

2. The method as claimed in the preceding point, wherein the step of determination of data which is representative of the period of oscillation of the oscillator comprises measurements, in particular measurements performed with free oscillation.

3. The method as claimed in the preceding point, wherein it firstly comprises the following step:

an escapement unit of the movement is dismantled, in particular an anchor, or the oscillator is fitted on a support which allows the oscillator to oscillate freely.

4. The method as claimed in one of the preceding points, wherein the step of use of the data comprises calculation of the imbalance characteristic from a formula which involves data determined during the step of determination.

5. The method as claimed in one of the preceding points, wherein the step of determination comprises measurements performed on a range of amplitudes, the extreme amplitude levels of which are spaced by 30°, preferably by 50°, and more preferably by 100°, at two amplitude values at least which are situated on both sides of 220°, the amplitudes being included in the interval]200°; 280° F.[, preferably in the interval]150°; 280°[, and still more preferably in the interval]100°; 300°[.

6. The method as claimed in one of the preceding points, wherein the at least two positions of the oscillator are positions in which the axis of oscillation of the oscillator is horizontal or substantially horizontal.

7. The method as claimed in the preceding point, wherein the at least two positions of the oscillator are positions in which the orientation of the oscillator differs by 90° or by more than 90°.

8. The method as claimed in one of the preceding point, wherein the at least two positions of the oscillator comprise four positions of the movement in which the axis of oscillation of the oscillator is horizontal or substantially horizontal, and wherein the orientations of the movement are spaced by 90° from one another, and in particular comprise the four vertical horology positions of the movement.

9. The method as claimed in the preceding point, wherein use is made of one or more of the three following formulae in order to calculate the imbalance characteristic:

$$bx = \frac{I\cdot(2\pi f)^2}{2\cdot 86400\cdot g}\cdot\frac{\sum_\theta \frac{J_1(\theta)}{\theta}\cdot(3H(\theta)-9H(\theta))}{\sum_\theta\left(\frac{J_1(\theta)}{\theta}\right)^2}$$

$$by = \frac{I\cdot(2\pi f)^2}{2\cdot 86400\cdot g}\cdot\frac{\sum_\theta \frac{J_1(\theta)}{\theta}\cdot(6H(\theta)-12H(\theta))}{\sum_\theta\left(\frac{J_1(\theta)}{\theta}\right)^2}$$

$$b = \sqrt{bx^2+by^2} = \frac{I\cdot(2\pi f)^2\cdot\sqrt{\left(\sum_\theta \frac{J_1(\theta)}{\theta}\cdot(3H(\theta)-9H(\theta))\right)^2 + \left(\sum_\theta \frac{J_1(\theta)}{\theta}\cdot(6H(\theta)-12H(\theta))\right)^2}}{2\cdot 86400\cdot g\cdot\sum_\theta\left(\frac{J_1(\theta)}{\theta}\right)^2}$$

where:

b: the norm of the vector imbalance;

bx: the component of the vector imbalance according to the x axis;

by: the component of the vector imbalance according to the y axis;

I: the inertia of the balance;

J1: the Bessel function of the order 1;

θ: the amplitude of the oscillation motion in [rad];

3H(θ), 6H(θ), 9H(θ) and 12H(θ): rate values in the four vertical horology positions of the movement (for example expressed in seconds per day);

the x and y axes correspond to the directions 9H and 12H.

10. The method as claimed in one of the preceding points, wherein the imbalance characteristic comprises or consists of:

an imbalance mass and an imbalance position on the balance; or an imbalance vector which is expressed by its norm and its direction.

11. The method as claimed in one of the preceding points, the step of putting the oscillation of the hairspring-balance oscillator into motion comprising the following sub-steps:

putting the oscillator into oscillation motion;

stopping to sustain the oscillations, and the step of determination of data which is representative of the period of oscillation of the oscillator comprises the following sub-step:

measuring the data which is representative of the period whilst the amplitude of the oscillation motion of the oscillator decreases.

12. The method as claimed in one of the preceding points, wherein it comprises a step of measurement of the amplitude of the oscillation motion.

A method for regulation according to the invention is defined by point 13 below.

13. A method for regulation of a hairspring; (5)-balance (4) oscillator (3), comprising the phase of determination of an imbalance characteristic of the oscillator as claimed in one of the preceding claims, and a step of modification of the balance in order to eliminate some or all of this imbalance from the balance.

A balance or an oscillator according to the invention is defined by point 14 below.

14. A balance (4) or hairspring-balance oscillator (3) obtained by implementation of the method for regulation according to the preceding point.

A horology movement according to the invention is defined by point 15 below.

15. A movement (2) comprising a hairspring-balance oscillator as claimed in the preceding point.

A horology piece according to the invention is defined by point 16 below.

16. A horology piece (1), in particular a watch, comprising a movement as claimed in the preceding claim, or a balance or a hairspring-balance oscillator as defined in point 14.

BRIEF DESCRIPTION OF THE DRAWINGS

The appended drawings represent by way of example an embodiment of a method for determining, in particular by calculating, an imbalance characteristic according to the invention and an embodiment of a method for regulation according to the invention.

DETAILED DESCRIPTION OF PARTICULAR EMBODIMENTS

In an embodiment of the method according to the invention, an oscillator is balanced by implementing a measurement of the apparent imbalance of the oscillator by means of a rate measurement according to the amplitude, and in particular a free oscillation measurement, i.e. which is carried out in a free oscillation mode of the oscillator, then implementing an adjustment of the imbalance, for example by addition/removal of material or regulation of the position of inertia blocks.

Figure 1:
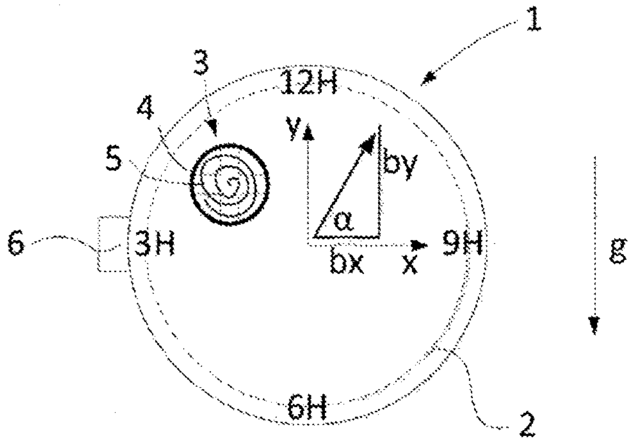
FIG. 1 is a rear view of a watch regulated according to an embodiment of the method for regulation according to the invention.

FIG. 1 represents a horology piece 1, in particular a watch, and particularly a wristwatch, seen from the rear, i.e. from the surface opposite that which shows the dial. The horology piece comprises a movement 2 including an oscillator 3. The oscillator for its part comprises a balance 4 and a hairspring 5.

The rear surface is in general the side which makes it possible to access the balance and to show its oscillations directly, and thus permit measurement of an oscillation period and/or oscillation amplitude by optical measurement means, which are more accurate than the acoustic measurement means generally used. The terrestrial gravitation field is represented by the vector g. In the configuration represented, the movement is in the vertical position "12H", i.e. the general plane of the movement is parallel to the vector g and the index "12H" of the dial fitted on the movement is situated at the top relative to the vector g (NIRS [Swiss Horology Industry Standards] notation, cf also "Traité de construction horlogère", p 741). The other vertical positions are defined in a similar manner, i.e. 3H (with the movement shaft 6 at the top), 6H and 9H.

Formulae show that the effect of the imbalance on the mean rate of four vertical positions separated by 90°, for example the four vertical horology positions (12H, 9H, 6H, 3H) is always zero, since the effects of the imbalance in the opposite positions cancel each another out in pairs. The 3H(θ), 6H(θ), 9H (θ) and 12H(θ): the rate values in the four vertical horology positions of the movement at the amplitude θ.

The sum is carried out on a certain number of discrete values of the amplitude θ, for example the values measured with an interval of 10°. It is found that the position at x of the imbalance is associated only with the measurements in the positions 3H and 9H, whereas its position at y is associated only with the measurements at 6H and 12H for the point of reference selected.

The formula which provides the dependence of the total imbalance b according to the amplitude θ is:

$$b = \sqrt{bx^2 + by^2} = \frac{I \cdot (2\pi f)^2 \cdot \sqrt{\left(\sum_\theta \frac{J_1(\theta)}{\theta} \cdot (3H(\theta) - 9H(\theta))\right)^2 + \left(\sum_\theta \frac{J_1(\theta)}{\theta} \cdot (6H(\theta) \cdot 12H(\theta))\right)^2}}{2 \cdot 86400 \cdot g \cdot \sum_\theta \left(\frac{J_1(\theta)}{\theta}\right)^2}$$

mean rate is thus completely independent from the imbalance, and it is therefore possible to use only the rate differences between each of the four vertical positions and their mean, in order to determine the imbalance.

The imbalance is determined, and in particular is calculated, not at a single amplitude, but over a wide range of values reached by the hairspring-balance oscillator. In addition, the measurement can be performed in free oscillation, for example by removing the anchor from the movement, or by fitting the hairspring-balance oscillator on a support designed for this purpose. The imbalance characteristic of the hairspring-balance oscillator is determined or calculated, in particular the imbalance characteristic of the hairspring-balance oscillator which is designed to be fitted in a horology movement, or is arranged to be fitted in a horology movement, is determined or calculated.

The procedure which makes it possible to determine the imbalance consists of applying minimization by means of least squares, starting from rate curves measured according to the amplitude, in order to deduce the intensity b of the imbalance and its direction a relative to the direction 9H. For this purpose, the components of the imbalance are introduced according to the x (9H) and y (12H) axes.

These components can be determined from the following formula, and are:

$$bx = \frac{I \cdot (2\pi f)^2}{2 \cdot 86400 \cdot g} \cdot \frac{\sum_\theta \frac{J_1(\theta)}{\theta} \cdot (3H(\theta) - 9H(\theta))}{\sum_\theta \left(\frac{J_1(\theta)}{\theta}\right)^2}$$

and $$by = \frac{I \cdot (2\pi f)^2}{2 \cdot 86400 \cdot g} \cdot \frac{\sum_\theta \frac{J_1(\theta)}{\theta} \cdot (6H(\theta) - 12H(\theta))}{\sum_\theta \left(\frac{J_1(\theta)}{\theta}\right)^2}$$

where:

I: the inertia of the balance;

J1: the Bessel function of the order 1;

θ: the amplitude of the oscillation motion in [rad];

The orientation α of the imbalance is obtained by means of an Arctan (by/bx) function, taking the sign into account.

Thus, the step of use of the data can comprise the calculation of the imbalance characteristic from a formula which involves use of the data determined during a step of determination of data which is representative of the period of oscillation of the oscillator.

It will be appreciated that it is possible to select another point of reference x-y relative to the orientation of the watch, or also to introduce a point of reference in three dimensions x-y-z. Persons skilled in the art will be able to adapt the above-described formulation to another choice of point of reference and/or reference positions of the horology movement or the oscillator.

Figure 2:
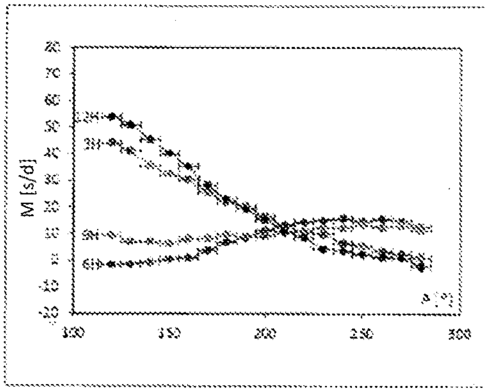
FIG. 2 is a graph indicating the rate M of a movement for different amplitudes A of free oscillation of the balance of the oscillator, and for different positions of the movement, the balance comprising an imbalance which has not been corrected.
Figure 3:
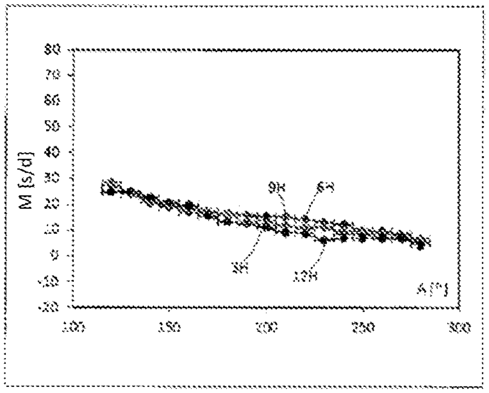
FIG. 3 is a graph indicating the rate M of the movement for different amplitudes A of free oscillation of the balance of the oscillator, and for different positions of the movement, the rate values being calculated from the values of the preceding graph, with cancellation of the imbalance effect.

FIGS. 2 and 3 show firstly a rate measurement according to the amplitude of free oscillation for a hairspring-balance oscillator fitted in the movement, and secondly the rate curves for the same motion after calculation, thus making it possible to subtract the effect of the imbalance. In this example, the method for determining the imbalance provides an imbalance with a value of b=5.4 μg·cm positioned at an angle of −57° relative to the direction 9H in the trigonometric direction, seen from the rear of the watch. It is then possible to recalculate the rate curves according to the amplitude in the vertical positions, by subtracting measurements of the imbalance effect calculated with the above values. It is found that in the case described, the essential part of the rate differences between the positions can be explained by the imbalance of the balance. After theoretical correction on the basis of the adjusted imbalance, as represented in FIG. 3, the residual noise between the four vertical positions corresponds to a standard deviation of 1.46 second/day (s/d), which is very low in relation to the rate differences of up to 50 second/day in the rate measurement before correction. At high amplitudes, the rate differences between positions, which are approximately ±7 second/day in the presence of imbalance, are typically reduced to ±2 second/day or ±3 second/day if the imbalance has been eliminated.

The method for determining the imbalance is based on determination of the apparent imbalance of the hairspring-balance oscillator, which is the imbalance calculated which makes it possible to reproduce the rate measurements as well as possible according to the amplitude of the oscillator, in particular the rate curves of the oscillator measured in the vertical position. Systematic measurements show that the apparent imbalance is greater than the imbalance of the balance alone (after balancing) in 80% of cases. Good balancing of the balance is thus partly downgraded by the assembly of the hairspring on the staff of the balance, as well as by fitting in the movement.

On this basis, it is possible to estimate the imbalance of an oscillator, for example on the basis of a measurement in free oscillation. A measurement of this type can for example be carried out on equipment for optical measurement of the rate, by removing the pallet from the horology movement. Equipment of this type is described for example by Vermot and Falco in the article in the Proceedings of the Swiss Chronometry Society Study Day 1998, p. 57, or in various patent documents (FR1210892, CH691992), and is sold inter alia under the name Watch Test Mechanics by the company Femto SA. Depending on the circumstances, it may however be advantageous to develop measurement equipment for this particular need, with a suitable measurement algorithm.

An embodiment of the method for determining an imbalance of a hairspring-balance oscillator of a horology movement is described hereinafter with reference to FIG. 10*a*.

In a first step 110, the variable i of a first counter is reset to 0.

In a second step 120, this first counter i is incremented by one unit.

In a third step 130, the hairspring-balance oscillator is put into oscillation motion at an $i^{th}$ amplitude. This putting into motion can be carried out as previously described according to two modes, i.e. a sustained oscillation mode or a free oscillation mode. In the free oscillation mode, the oscillator is arranged in the movement or outside the movement, for example on a support designed for this purpose. The balance does not interact with a pallet or with an escapement brake lever. The oscillations are not sustained. This mode can be obtained by dismantling an escapement unit, in particular a pallet, of the movement, or by assembling the hairspring-balance oscillator in motion before assembling the pallet, or by fitting the hairspring-balance oscillator on a support designed for this purpose.

On the other hand, in a sustained oscillation mode, the oscillations are sustained by torque transmitted by the gear train to the balance by means of an element such as a pallet.

The $i^{th}$ amplitude is preferably comprised in the interval]200°; 280°[, preferably in the interval]150°; 280°[, and still more preferably in the interval]100°; 300°[.

In a fourth step 140, the variable j of a second counter is reset to 0.

In a fifth step 150, this second counter j is incremented by one unit.

In a sixth step 160 the movement, and therefore the oscillator are put into a $j^{th}$ position relative to the terrestrial gravitation field. Preferably, this $j^{th}$ position is a vertical position, and more preferably a vertical horology position, for example the position 3H, the position 6H, the position 9H, or the position 12H.

In a seventh step 170, there is determination, in particular by implementation of a measurement step, of data which is representative of the period of oscillation of the oscillator. For example, the data is the duration of a period of oscillation of the oscillator, or the duration of a plurality of periods of oscillation of the oscillator.

In an eighth step 180, it is tested whether the variable j of the second counter is lower than, or equal to, a threshold n. If this is the case, there is a return to the step 150. If this is not the case, there is transition to a ninth step 190.

In this ninth step 190, it is tested whether the variable i of the first counter is lower than, or equal to, a threshold m. If this is the case, there is a return to the step 120. If this is not the case, there is transition to a tenth step 200.

In the tenth step 200, there is calculation of an imbalance characteristic of the oscillator. The imbalance characteristic can comprise:

- an imbalance mass and an imbalance position on the balance; or
- an imbalance vector expressed by its norm and its direction.

In order to implement this calculation, use is made of the data determined in the different iterations of the step 170. This data makes it possible to construct n rate functions, according to the amplitude or isochronism $Mj(\theta)$, j=1, . . . , n.

Preferably, m≥2, m representing the number of amplitudes for which measurements are performed. Measurements are therefore performed at two amplitudes at least. Preferably, the two extreme amplitudes differ by at least 30°, preferably by at least 50°, and more preferably by at least 100°. Also preferably, the two extreme amplitudes are on both sides of 220°. More preferably, the amplitudes are included in the interval]200°; 280°[, preferably in the interval]150°; 280°[, and still more preferably in the interval]100°; 300°[. Preferably, the number of measurements is m≥9, and more preferably m≥20.

Preferably, n≥2, n representing the number of positions of the movement for which measurements are performed. There are therefore measurements in two positions at least. These at least two positions are positions in which the axis of oscillation of the oscillator is horizontal or substantially horizontal. Preferably, n=3 or n=4. It is noted that an axis of oscillation which is inclined relative to the horizontal, for example an axis which is inclined by 45° relative to the horizontal, could also make it possible to obtain good results.

Also preferably, the two positions at least of the movement are positions in which the orientation of the oscillator differs by 90° or by more than 90°.

Advantageously, the two positions at least of the movement comprise four positions of the movement, wherein the axis of oscillation of the oscillator is horizontal or substantially horizontal, and wherein the orientations of the movement are spaced by 90° from one another, and in particular comprise the four vertical horology positions of the movement.

As previously seen, in order to calculate the imbalance characteristic, use is advantageously made of one or more of the following three formulae:

$$bx = \frac{I\cdot(2\pi f)^2}{2\cdot 86400\cdot g}\cdot\frac{\sum_\theta \frac{J_1(\theta)}{\theta}\cdot(3H(\theta)-9H(\theta))}{\sum_\theta\left(\frac{J_1(\theta)}{\theta}\right)^2}$$

and $$by = \frac{I\cdot(2\pi f)^2}{2\cdot 86400\cdot g}\cdot\frac{\sum_\theta \frac{J_1(\theta)}{\theta}\cdot(6H(\theta)-12H(\theta))}{\sum_\theta\left(\frac{J_1(\theta)}{\theta}\right)^2}$$

$$b = \sqrt{bx^2+by^2} = \frac{\left(I\cdot(2\pi f)^2\cdot\sqrt{\left(\sum_\theta \frac{J_1(\theta)}{\theta}\cdot(3H(\theta)-9H(\theta))\right)^2+\left(\sum_\theta \frac{J_1(\theta)}{\theta}\cdot(6H(\theta)-12H(\theta))\right)^2}\right)}{\left(2\cdot 86400\cdot g\cdot\sum_\theta\left(\frac{J_1(\theta)}{\theta}\right)^2\right)}$$

where:
b: the norm of the vector imbalance;
bx: the component of the vector imbalance according to the x axis;
by: the component of the vector imbalance according to the y axis;
I: the inertia of the balance;
J1: the Bessel function of the order 1;
θ: the amplitude of the oscillation motion in [rad];
3H(θ), 6H(θ), 9H(e) and 12H(θ): rate values in the four vertical horology positions of the movement (for example expressed in seconds per day);
the x and y axes correspond to the directions 9H and 12H as in FIG. 1.

In the case when rate measurements are performed according to the amplitude in the four vertical horology positions, for example in the free oscillation mode, four rate functions 3H(θ), 6H(θ), 9H(e) and 12H(θ) are obtained, defined in an interval of amplitude which is typically between 100° and 300°, for example in intervals of 10°. The horizontal measurements (CH and FH) are not necessarily taken into account. A measurement of this type can also be performed in sustained oscillation mode, i.e. on the complete movement, with sustaining of the oscillations via the escapement. A measurement of this type takes into account the effect of the escapement, and in general takes longer to perform.

From the point of view of determination of the imbalance, the sustained and free oscillation measurements are equivalent. The measurement in free oscillation is however more favorable, since measurement of the escapement effect is avoided. It can also be envisaged to subtract from the curves measured the (theoretical or measured) signature of the hairspring alone (and/or of the escapement in sustained mode), in order to correct only the effects caused by the imbalance of the balance.

It will be appreciated that the first and second counters need not physically exist in the implementation of the method. They are there to translate the logic of the method and its implementation. It is clear that they can translate the awareness of an operator who knows that he must perform measurements for a given series of positions of the movement, and for a given series of amplitudes of the oscillations of the oscillator.

In addition, the amplitudes need not be exactly identical for the measurements performed in the different positions. In the implementation of the method, it is thus perfectly possible to determine the data which is representative of the period of oscillation at an amplitude close to a target amplitude, then to use as data in the calculation of the imbalance characteristic a value which is interposed between two measured values. It can also be envisaged to perform the measurements at any different amplitudes, and to carry out regression to all the values measured, without processing or interpolation.

Figure 10A:
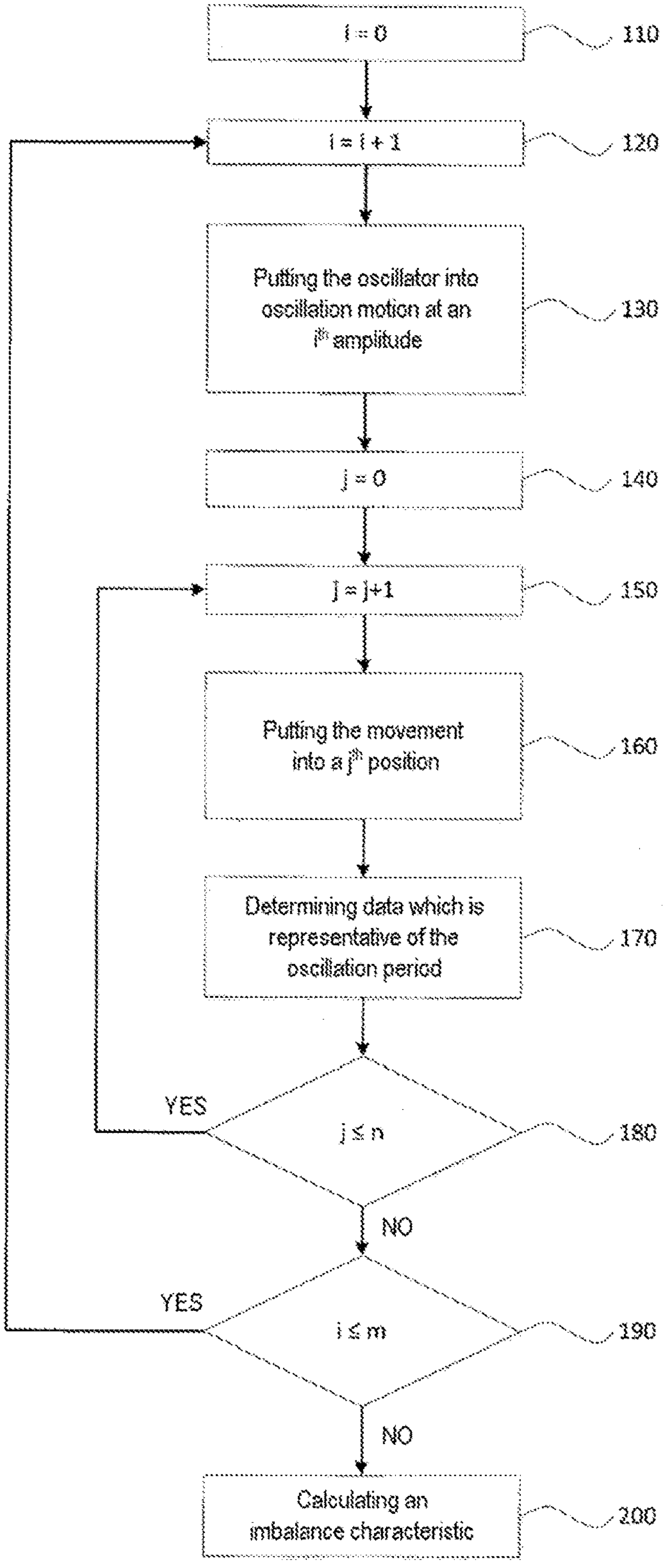
FIG. 10*a* is a flow diagram of a first embodiment of a method for determination of an imbalance according to the invention.
Figure 10B:
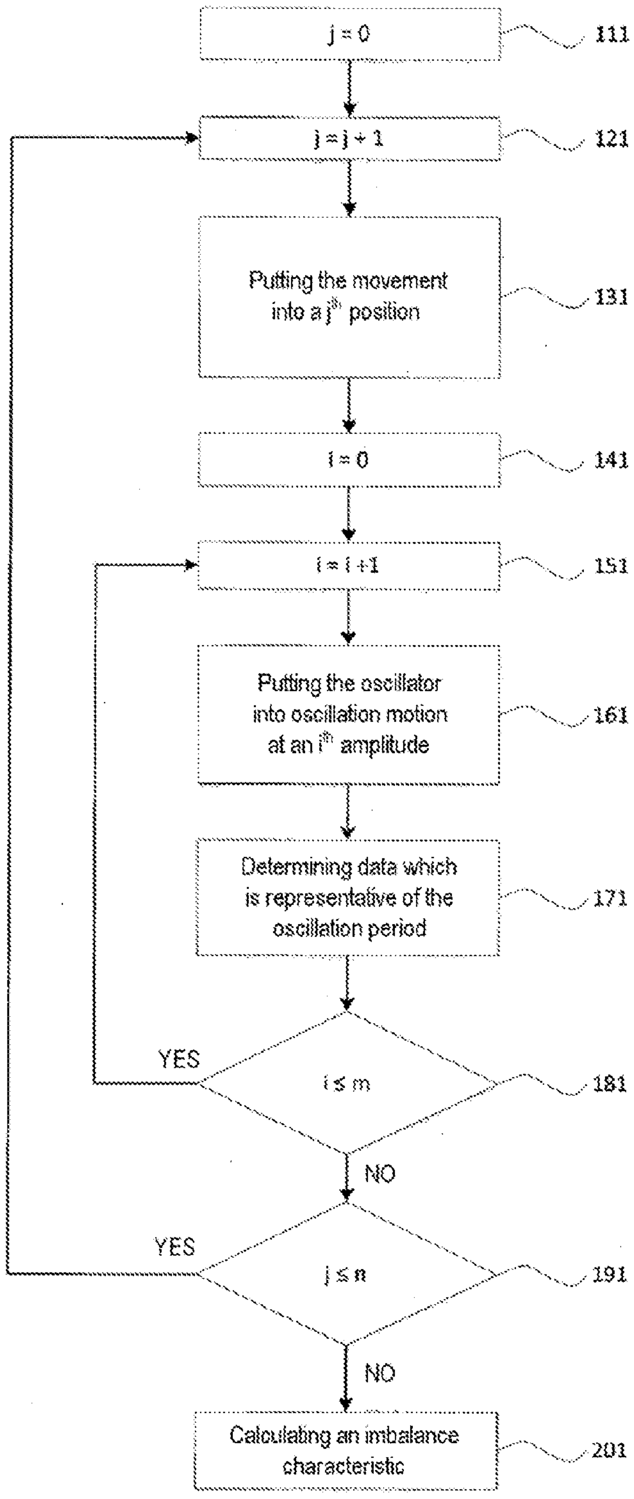
FIG. 10*b* is a flow diagram of a second embodiment of a method for determination of an imbalance according to the invention.

If the measurements are performed in a free oscillation (or non-sustained) mode, it is possible to invert the order of the steps, as indicated in FIG. 10*b* which represents another embodiment of the method for determination. In fact, in such a case, it is more convenient and faster to perform the measurements for different amplitudes in a given position of the movement, before positioning the movement in another position in order to perform measurements according to another series of amplitudes. In this other embodiment, the steps 131, 161, 171 and 201 are identical respectively to the steps 160, 130, 170 and 200.

In the case when measurements are performed in a sustained oscillation mode, it is possible to proceed as represented in FIG. 10*a*. In fact, it is more convenient and faster to perform the measurements for different positions at a given amplitude, before modifying the amplitude in order to perform measurements in other positions of the movement.

In the case when measurements are performed in a free oscillation mode, the interval of amplitude concerned can be extended, for example to 400°, which corresponds to the second amplitude value for which the imbalance effect is cancelled out. Consequently, for an extended interval of amplitude of this type in free oscillation mode, the amplitudes are preferably included in the interval]200°; 400°[, preferably in the interval]150°; 400°[, and still more preferably in the interval]100°; 400°[. Preferably, the number of measurements is m≥9, and more preferably m≥20.

In the case when measurements are performed in two or three vertical positions, it is possible to select at least two positions which are perpendicular to one another, and to apply the hypothesis that the development of the mean rate is linear between the amplitude values for which the imbalance effect is cancelled out.

Figure 11:
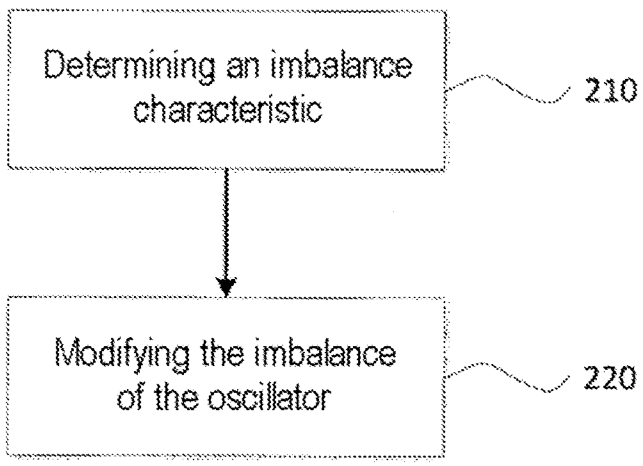
FIG. 11 is a flow diagram of an embodiment of a method for regulation of a hairspring-balance oscillator according to the invention.

An embodiment of the method for regulation of a hairspring-balance oscillator is described hereinafter with reference to FIG. 11.

In a first phase 210, there is determination of an imbalance characteristic of a hairspring-balance oscillator of a horology movement. For example, there is determination of the imbalance characteristic in accordance with the method for determination according to the invention or according to the embodiments of the method for determination previously described.

Figure 4:
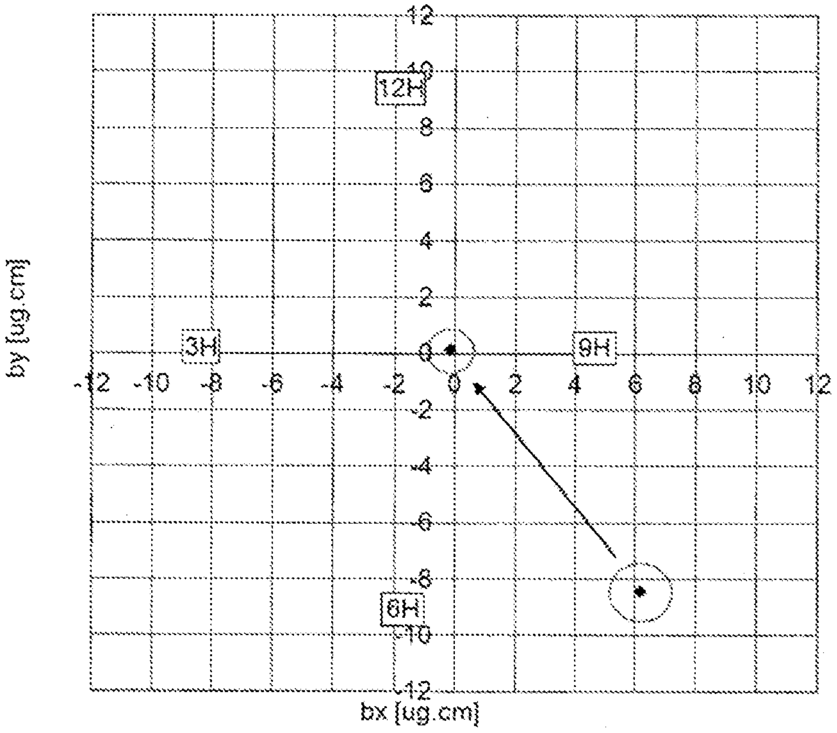
FIG. 4 is a graph representing the imbalance of an oscillator with its components bx and by before and after implementation of the method for regulation according to the invention.

In a second phase 220, the imbalance of the oscillator is modified. The oscillator or the hairspring balance assembly can be modified by conventional means for removal of material (milling, laser ablation, or the like), addition of material (laser depositing, depositing by means of inkjet, or the like) or displacement of material (displacement of an inertia block, or the like). The imbalance can be modified in order to obtain a given value and orientation of imbalance, in particular an imbalance value which is zero or substantially zero. FIG. 4 shows an example, with a movement, the oscillator of which shows apparent imbalance in motion, after assembly of the hairspring and fitting in movement, of 10.5 μg·cm according to the measurement in free oscillation. After careful milling, it was possible to reduce the apparent imbalance to a value less than 0.2 μg·cm. The effect on the rate curves is significant, and clearly shows the advantage of the method for improvement of the chronometric performance of the movement.

Figure 5:
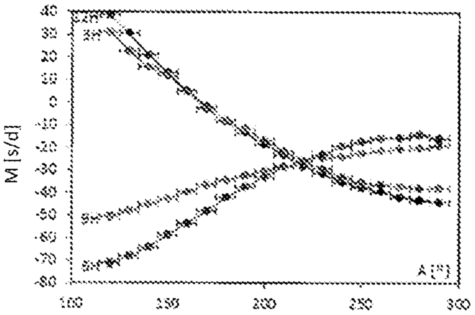
FIG. 5 is a graph indicating the rate M of a movement for different amplitudes A of free oscillation of the balance of the oscillator, and for different positions of the movement, the oscillator comprising an imbalance represented in FIG. 4, before regulation.
Figure 6:
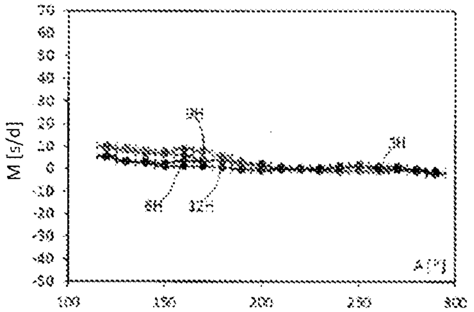
FIG. 6 is a graph indicating the rate M of a movement for different amplitudes A of free oscillation of the balance of the oscillator, and for different positions of the movement, the oscillator comprising an imbalance represented in FIG. 4, after regulation.

FIGS. 5 and 6 show the two rate measurements according to the amplitude in free oscillation, corresponding to the two states illustrated in FIG. 4, before implementation of the method for regulation, and after implementation of the method for regulation.

It is found that the rate differences between positions, in particular between the vertical positions, are reduced greatly by the adjustment of the apparent imbalance.

This gain is also verified in sustained oscillation, i.e. in standard functioning after fitting of the pallet of the escapement. The chronometric measurements performed on this piece in the final state of adjustment of the imbalance and inertia show very good performance, with a maximum rate difference between the vertical positions of less than 1 second/day, and, as indicated in the following table, a maximum rate difference between the six positions of only 3 second/day, which is excellent.

| Position | CH | FH | 3H | 6H | 9H | 12H |
|---|---|---|---|---|---|---|
| Rate [second/day] | +3 | +2 | 0 | 0 | 0 | 0 |
| Amplitude [°] | 283 | 294 | 225 | 235 | 238 | 248 |

The gains obtained in free oscillation thus also apply in sustained oscillation, and therefore when the horology piece is worn on the wrist of the user.

It is also possible to adjust the balancing of the balance simply by modifying the position of the inertia blocks designed for regulation of the inertia on a balance (assuming that the balance is provided with such blocks). In fact, these inertia blocks can be displaced radially. The imbalance caused by the displacement of an inertia block is therefore equal to the product of the mass of the latter times its displacement. The maximum imbalance value which can be corrected will depend on the mass and stroke of the inertia blocks. In addition, if a balance comprises only two inertia blocks, it is possible to modify the imbalance only in one direction corresponding to the diameter which connects the two inertia blocks. More generally, and irrespective of the number of inertia blocks, it is possible to modify the imbalance only in the direction of displacement of the center of gravity of the inertia blocks. On a typical balance, it can be estimated that the regulation range is 20 μg·cm at least, which is amply sufficient to correct residual imbalance after a first balancing operation carried out on a balance alone.

Figure 7:
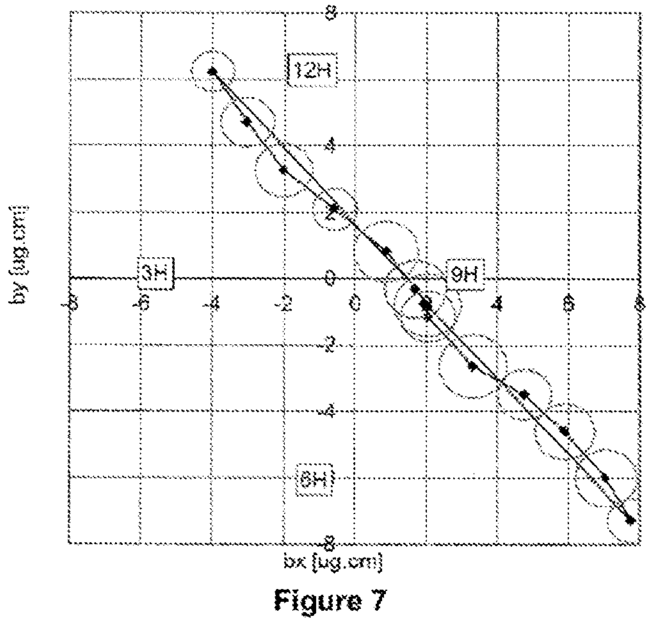
FIG. 7 is a graph representing the imbalances of different configurations of an oscillator, the balance of which comprises regulation inertia blocks.

FIG. 7 illustrates the effect for a balance provided with two inertia blocks only, arranged at 180° relative to one another. As in FIG. 4, the circles around the imbalance values represent an estimation of the measurement error. Displacing an inertia block along its post modifies the imbalance finely in that direction. The regulation range is typically ±10.5 μg·cm around the original value.

Figure 8:
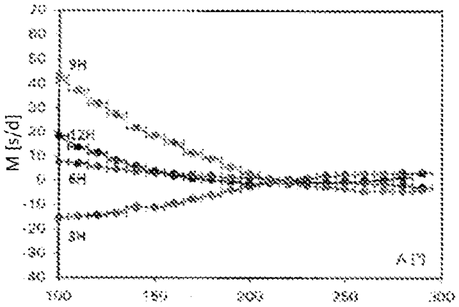
FIG. 8 is a graph indicating the rate M of a movement for different amplitudes A of free oscillation of the balance of the oscillator, and for different positions of the movement, before regulation.
Figure 9:
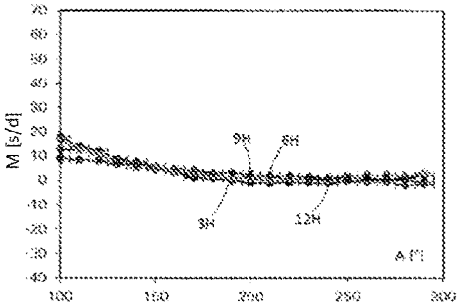
FIG. 9 is a graph indicating the rate M of the movement measured in FIG. 8, for different amplitudes A of free oscillation of the balance of the oscillator, and for different positions of the movement, after regulation of the imbalance by means of regulation inertia blocks.

It will be appreciated that a balance equipped with 3 inertia blocks or more will permit almost perfect correction of its apparent imbalance. FIGS. 8 and 9 show an example for a balance provided with two pairs of two inertia blocks with different masses, each pair being arranged opposite the other. The apparent imbalance in the initial state (FIG. 8) is 8.8 μg·cm. With a calculation in the first approximation which takes into account only the linear displacement of the masses according to a radial direction, the total correction to be applied has been estimated as rotation of 0.7 of a turn for the inertia block situated in the direction 3H of the movement, 0.07 of a turn for the inertia block 6H, −0.7 of a turn for the inertia block 9H, and −0.07 of a turn for the inertia block 12H. The apparent imbalance after this correction is 0.6 μg·cm (FIG. 9), once again representing a remarkable improvement, which can be seen clearly in the rate measurements according to the amplitude.

If it is wished to adjust only the balance of the hairspring balance, particular attention will be paid to refraining from modifying the inertia of the assembly significantly, in order not to modify the rate of the movement. Alternatively, it is also possible, during the same operation, to regulate the rate of the movement and the imbalance of the hairspring-balance. It is also possible to repeat the measurement and correction process several times if necessary, for example if the level of the initial imbalance is high.

The imbalance characteristic is such that the modification of the oscillator by removal of this imbalance characteristic of the balance has the consequence of minimizing a criterion which represents an accumulation, for the different amplitudes, of the differences of data which is representative of the oscillation period of the balance in the different positions of the oscillator.

It is thus possible to envisage the following procedure for fine correction of the apparent imbalance:

- balancing of the balance alone;
- driving the hairspring in, fitting in the movement;
- measurement of rate according to the amplitude (for example in free oscillation), in order to determine the apparent imbalance and/or the mean frequency of oscillation and/or the mean rate;
- setting the frequency and/or correction of the apparent imbalance, for example:
  - by removal of material;
  - by addition of material;
  - by displacement of material, for example of inertia blocks;
  - by displacement of inertia blocks without modification of the inertia, in order to correct the imbalance alone.

The invention also relates to a balance or a hairspring-balance oscillator obtained by implementation of the method for regulation according to the invention.

The invention also relates to a movement comprising a hairspring-balance oscillator of this type.

Finally, it relates to a horology piece, in particular a watch, comprising a movement of this type or a balance of this type or a hairspring-balance oscillator of this type.

Figure 12:
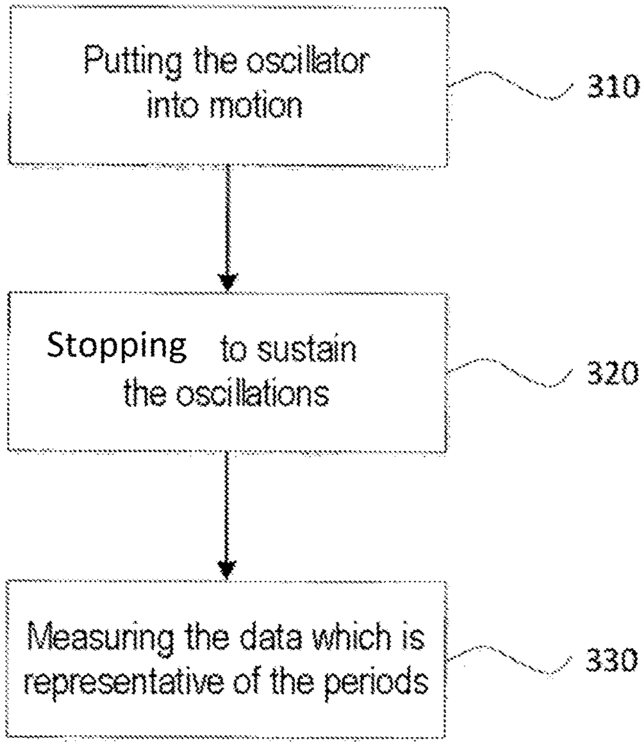
FIG. 12 is a flow diagram of a variant embodiment of a method for determining an imbalance.

In a variant embodiment, the method for determining the imbalance characteristic comprises the step 160 or 161, and this step includes the following sub-steps described in FIG. 12.

In a first sub-step 310, the oscillator is put into oscillation motion, and can oscillate freely, for example by removing the pallet from the movement, or by fitting the hairspring-balance oscillator on a support which allows it to oscillate freely.

In a second, optional sub-step 320, the sustaining of the oscillation is stopped.

In this variant embodiment, the method for determining the imbalance characteristic comprises a step 170 or 171, and this step includes the following sub-step described. In a third sub-step 330, the data which is representative of the period is measured, whilst the amplitude of the oscillation motion of the oscillator decreases.

In other words, the oscillator is put into a free oscillation mode, then the data which is representative of the period is measured, whilst the amplitude of the oscillation motion of the oscillator decreases.

The method can comprise a step of measurement of the amplitude of the oscillation motion. This measurement of the amplitude, like that of the oscillation period, can be performed by means of an optical measurement apparatus.

The steps of measurement of the period and/or the amplitude can be performed at regular intervals of time. Thus, at each time step, there is determination of the oscillation period and/or the oscillation amplitude associated with this period.

Alternatively, the steps of measurement of the period can be performed at regular or given amplitude intervals. Thus, in particular by means of an apparatus, there is observation of the decrease in the amplitude of the oscillations, and, when an amplitude, the period of which is to be determined, is reached, this period is measured.

In this document, "rate" means the instantaneous rate of the movement or of the horology piece, i.e. its rate at the instant of observation. From this there is deduced the daily rate, which is the difference between two states of the horology piece, separated by an interval of 24 hours (in other words the difference in display of a horology piece between two instants separated by exactly 24 hours), on the understanding that the instantaneous rate will not be modified for 24 hours.

The invention claimed is:

1. A method of calculating an imbalance characteristic of a hairspring-balance oscillator, the method comprising:

putting the hairspring-balance oscillator into an oscillating motion at first and second amplitudes at least;

determining, for the first amplitude, at at least first and second positions of the oscillator, respective first and second data which are representative of a period of oscillation of the oscillator, and for the second amplitude, at at least third and fourth positions of the oscillator, respective third and fourth data which are representative of the period of oscillation of the oscillator, the first and second data determined for the first amplitude and the third and fourth data determined for the second amplitude forming a set of data; and calculating, from a comparison among the set of data obtained from the determining, the imbalance characteristic of the hairspring-balance oscillator.

2. The method as claimed in claim 1, wherein the determining of the set of data which is representative of the period of oscillation of the oscillator comprises measurements.

3. The method as claimed in claim 2, which firstly comprises:

dismantling an escapement unit of a horology movement comprising the hairspring-balance oscillator, or fitting the oscillator on a support which allows the oscillator to oscillate freely.

4. The method as claimed in claim 1, wherein using of the set of data comprises calculating the imbalance characteristic from a formula which involves the set of data determined during the determining.

5. The method as claimed in claim 1, wherein the determining comprises performing measurements on a range of amplitudes, wherein the range of amplitudes comprises (i) at least two amplitudes values spaced by at least 30° and (ii) at least two amplitude values situated on both sides of 220° and included in an interval of from 150° to 280°.

6. The method as claimed in claim 1, wherein the at least first, second, third and fourth positions of the oscillator are positions in which an axis of oscillation of the oscillator is horizontal or substantially horizontal.

7. The method as claimed in claim 6, wherein the at least first and second positions of the oscillator are positions in which an orientation of the oscillator differs by 90° or more, and the at least third and fourth positions of the oscillator are positions in which an orientation of the oscillator differs by 90° or more.

8. The method as claimed in claim 1, wherein the at least first and second positions of the oscillator comprise four positions of a horology movement comprising the hairspring-balance oscillator in which an axis of oscillation of the oscillator is horizontal or substantially horizontal, and wherein orientations of the movement are spaced by 90° from one another, and the at least third and fourth positions of the oscillator comprise four positions of a horology movement comprising the hairspring-balance oscillator in which an axis of oscillation of the oscillator is horizontal or substantially horizontal, and wherein orientations of the movement are spaced by 90° from one another.

9. The method as claimed in claim 8, comprising calculating the imbalance characteristic by one or more of the three following formulae:

$$bx = \frac{I \cdot (2\pi f)^2}{2 \cdot 86400 \cdot g} \cdot \frac{\sum_{\theta} \frac{J_1(\theta)}{\theta} \cdot (3H(\theta) - 9H(\theta))}{\sum_{\theta} \left(\frac{J_1(\theta)}{\theta}\right)^2}$$

$$by = \frac{I \cdot (2\pi f)^2}{2 \cdot 86400 \cdot g} \cdot \frac{\sum_{\theta} \frac{J_1(\theta)}{\theta} \cdot (6H(\theta) - 12H(\theta))}{\sum_{\theta} \left(\frac{J_1(\theta)}{\theta}\right)^2}$$

$$b = \sqrt{bx^2 + by^2} = \frac{\left(I \cdot (2\pi f)^2 \cdot \sqrt{\left(\sum_{\theta} \frac{J_1(\theta)}{\theta} \cdot (3H(\theta) - 9H(\theta))\right)^2 + \left(\sum_{\theta} \frac{J_1(\theta)}{\theta} \cdot (6H(\theta) - 12H(\theta))\right)^2}\right)}{\left(2 \cdot 86400 \cdot g \cdot \sum_{\theta} \left(\frac{J_1(\theta)}{\theta}\right)^2\right)}$$

where:

b: the norm of the vector imbalance;

bx: the component of the vector imbalance according to the x axis;

by: the component of the vector imbalance according to the y axis;

I: the inertia of the balance;

J1: the Bessel function of the order 1;

θ: the amplitude of the oscillation motion in [rad];

3H(θ), 6H(θ), 9H(θ) and 12H(θ): rate values in the four vertical horology positions of the movement;

the x and y axes correspond to the directions 9H and 12H.

10. The method as claimed in claim 1, wherein the imbalance characteristic comprises:

an imbalance mass and an imbalance position on a balance of the hairspring-balance oscillator; or an imbalance vector which is expressed by a norm and a direction of the imbalance vector.

11. The method as claimed in claim 1, wherein the putting the hairspring-balance oscillator into the oscillating motion comprises the following actions:

putting the oscillator into the oscillating motion;

stopping to sustain the oscillating motion, and wherein the step of determining the set of data which is representative of the period of oscillation of the oscillator comprises the following sub-step:

measuring data which is representative of the period whilst the amplitude of the oscillation motion of the oscillator decreases.

12. The method as claimed in claim 1, comprising measuring an amplitude of the oscillating motion.

13. A method for regulation of a hairspring-balance oscillator, comprising:

performing the method of calculating an imbalance characteristic of the hairspring-balance oscillator in accordance with claim 1, and modifying a balance of the hairspring-balance oscillator in order to eliminate some or all of the imbalance from the balance.

14. A regulated hairspring-balance oscillator obtained by implementation of a method comprising:

providing a hairspring-balance oscillator, putting the hairspring-balance oscillator into an oscillating motion at first and second amplitudes at least;

determining, for the first amplitude, at at least first and second positions of the oscillator, respective first and second data which are representative of a period of oscillation of the oscillator, and for the second amplitude, at at least third and fourth positions of the oscillator, respective third and fourth data which are representative of the period of oscillation of the oscillator, the first and second data determined for the first amplitude and the third and fourth data determined for the second amplitude forming a set of data;

calculating, from a comparison among the set of data obtained from the determining, an imbalance characteristic of the hairspring-balance oscillator; and modifying a balance of the hairspring-balance oscillator in order to eliminate some or all of the imbalance characteristic from the balance, so as to obtain the regulated hairspring-balance oscillator.

15. A horology movement comprising the hairspring-balance oscillator as claimed in claim 14.

16. A horology piece comprising the horology movement as claimed in claim 15.

17. The method as claimed in claim 1, wherein the hairspring-balance oscillator is designed to be fitted in a horology movement.

18. The method as claimed in claim 2, wherein the measurements are performed with free oscillation.

19. The method as claimed in claim 3, wherein the escapement unit is an anchor.

20. The method as claimed in claim 5, wherein the range of amplitudes comprises (i) at least two amplitude values spaced by at least 50°, and (ii) at least two amplitude values included in an interval of from 200° to 280°.

* * * * *